United States Patent
Hwang

Patent Number: 6,016,925
Date of Patent: Jan. 25, 2000

[54] CD RACK

[75] Inventor: James Hwang, Taipei, Taiwan

[73] Assignee: Kenmark Industrial Co., Ltd., Taipei, Taiwan

[21] Appl. No.: 09/133,487

[22] Filed: Aug. 12, 1998

[51] Int. Cl.$^7$ .................................................. A47G 29/00
[52] U.S. Cl. ............................................................. 211/40
[58] Field of Search ..................................... 211/40, 41.12, 211/194; D6/407

[56] References Cited

U.S. PATENT DOCUMENTS

| | | | |
|---|---|---|---|
| 5,191,983 | 3/1993 | Hardy | 211/41.12 |
| 5,370,243 | 12/1994 | Rosairo | 211/40 |
| 5,423,434 | 6/1995 | Chen | 211/40 |
| 5,715,948 | 2/1998 | Hung | 211/40 |
| 5,788,088 | 8/1998 | Kao | 211/40 |

*Primary Examiner*—Alvin Chin-Shue
*Assistant Examiner*—Sarah Purol
*Attorney, Agent, or Firm*—Bacon & Thomas, PLLC

[57] ABSTRACT

A CD rack comprised of a base and multiple separation plates and locking caps, wherein, multiple hollow puncheons are provided on the corners on the top of the separation plates. The hollow puncheons are provided each on both sides thereof facing outwardly and inwardly respectively with a first hook. The locking caps are each a hollow body, and are provided each with an engaging through slot exteriorly and a depressed engaging slot interiorly, In assembling, one separation plate is laid on the top surface of the base. Then the hollow locking caps are fitted over the hollow puncheons of the separation plate to make engagement of multiple hooks provided on the hollow puncheons with the engaging through slots. And the hollow locking caps are inserted in the interior of another separation plate to make engagement of multiple second hooks on the hollow puncheons with multiple second engaging through slots on the hollow locking caps. In this way, by fitting of the hollow locking caps over the hollow puncheons on the separation plates, the separation plates can be assembled layer by layer parallelly in a firm state, and the amount of the layers can be flexibly increased or reduced for receiving CDs.

1 Claim, 2 Drawing Sheets

CD RACK

BACKGROUND OF THE INVENTION

1. Field of the Invention

The present invention is related to a CD rack for receiving CDs, it is firm in structure and is unlimited in increasing receiving spaces of the CD rack by mutual locking of a plurality of puncheons and a plurality of independent locking pieces.

2. Description of the Prior Art

A conventional CD is used as a general medium for saving and reading of sound, image or data and information, by virtue of its light weight, thinness and large information storage capacity, it is really a favorite today in the field of data and information of sound and image. Although a CD is light weighted and thin, a cassette for it occupies quite a space, by virtue that storage of the CD can not be done simply with the disk itself, a conventional CD rack is used to store CDs together with their cassettes. The CD rack shown in FIG. 1 is one of the conventional CD racks used presently, and is comprised structurally of a base 10 on which there are three upright posts 11, each post 11 is provided with a plurality of equidistantly spaced slots 12, a plurality of CD receiving plates 13 are supported on the slots 12 of the upright posts 11, in this way, the CDs can be stored in the spaces between every two CD receiving plates 13.

The above stated CD rack 1 can be used for insertion of CDs, however, it is structurally defective in design, and is functionally ineffective accordingly. As an example, the CD receiving plates 13 supported on the slots 12 of the upright posts 11 provided with the slots 12 for insertion of the CD receiving plates 13 are limited in height. They are unable to create very large storage capacity for CDs. And more, if it is desired to increase the height of the upright posts 11 and the amount of slots 12 for creating large storage capacity for receiving CDs, a limitation exists. That is, the higher are the upright posts 11, the larger the waving phenomenon of the upright posts 11 can be seen by virtue of the flexibility thereof. This is even unfavorable for mounting the CD receiving plates 13 and storage of CDs, besides, increment of insertion spaces can make the upright posts 11 unduly prominent especially when the spaces are vacant.

SUMMARY OF THE INVENTION

In order to effectively solve the above stated disadvantage resided in conventional CD racks, the inventor of the present invention provides a CD rack which is constructed by the mode of engaging and locking. In practice, a plurality of hollow puncheons are provided on the corners on the top of a plurality of separation plates for receiving CDs. A plurality of hooks are provided on each puncheon. A plurality of independent locking caps are provided with a plurality of engaging slots thereon. In this way, each puncheon on a separation plate can be fitted over with a locking cap and can be engaged therewith. Then a protruding end of the locking cap is inserted into a hollow puncheon on another separation plate to engage therewith. Therefore, by fitting/insertion the independent locking caps over/in the hollow puncheons, the separation plates can be mounted in multiple layers whereon the independent locking caps are used to control the spacing between every two separation plates. A CD rack constructed in this mode can not only provide a firm stand for receiving CDs, but can also have the whole assembly constructed only by combination of the two kind of components all over it, namely the separation plates and the independent locking caps. Therefore, a new receiving space can be provided immediately when it is required. By this, there is no feeling of time consuming, bother and disharmony as is the case on a conventional CD rack which is provided with a lot of slots on a plurality of upright posts.

The present invention will be apparent after reading the detailed description of the preferred embodiment thereof in reference to the accompanying drawings.

DETAILED DESCRIPTION OF THE PREFERRED EMMBODIMENT

Figure 1:
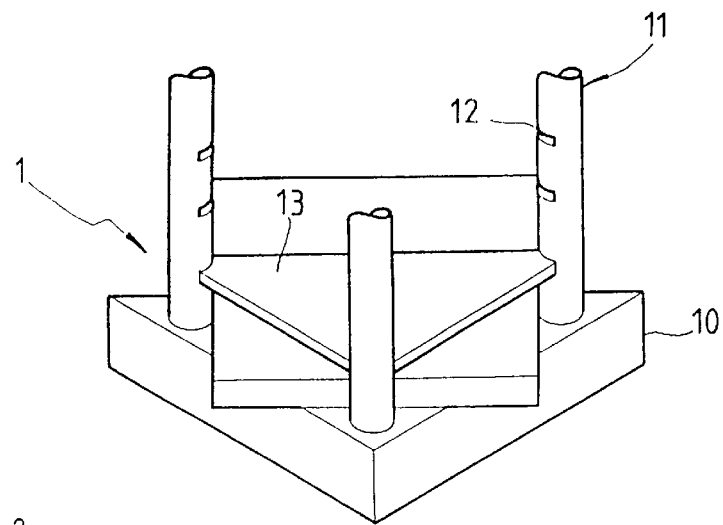
FIG. 1 is a perspective view showing the appearance of a conventional CD rack.
Figure 3:
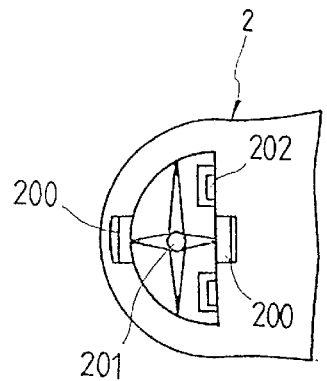
FIG. 3 is a top view of a puncheon on a separation plate of the present invention.
Figure 2:
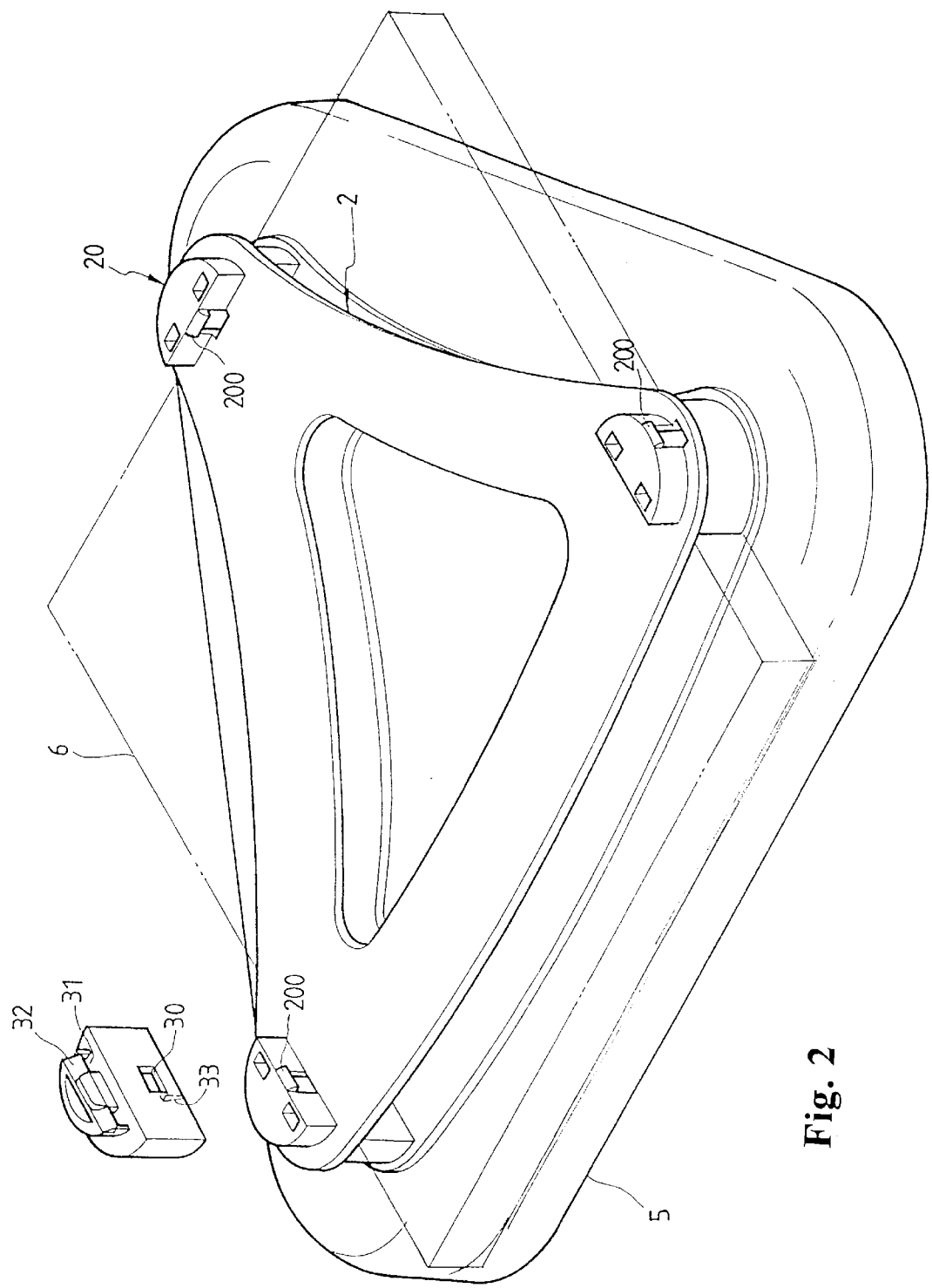
FIG. 2 is a perspective view sowing the appearance of an embodiment of the present invention.

Referring to FIGS. 2 and 3, the present invention is comprised mainly of a plurality of separation plates 2 and a plurality of independent locking caps 3, wherein, a plurality of hollow puncheons 20 are provided on the corners on the top of the separation plates 2. The hollow puncheons 20 are provided each on both sides thereof opposite mutually and respectively facing outwardly and inwardly with a first hook 200 at the middle of the side. The interior top centers of the hollow puncheons 20 form each a top core 201. One of the above-mentioned sides facing inwardly is provided with two second hooks 202. The independent locking caps 3 are each provided with an upper and a lower hollow body. The lower portion thereof is provided at one side of it with a first engaging through slot 30; while the upper portion thereof is provided at the bottom of it with two second engaging through slots 31. A slope 32 is formed from the top of the second engaging slots 31 to the top of the locking cap 3. Another slope 33 is formed interiorly of the locking cap 3 both near the first engaging slot 30 and at the position on a curved surface opposite to the first engaging slot 30. The curved surface is not provided with a first engaging slot 30, while the slope thereon is partially depressed to form a third engaging slot 34 (FIG. 4).

Figure 4:
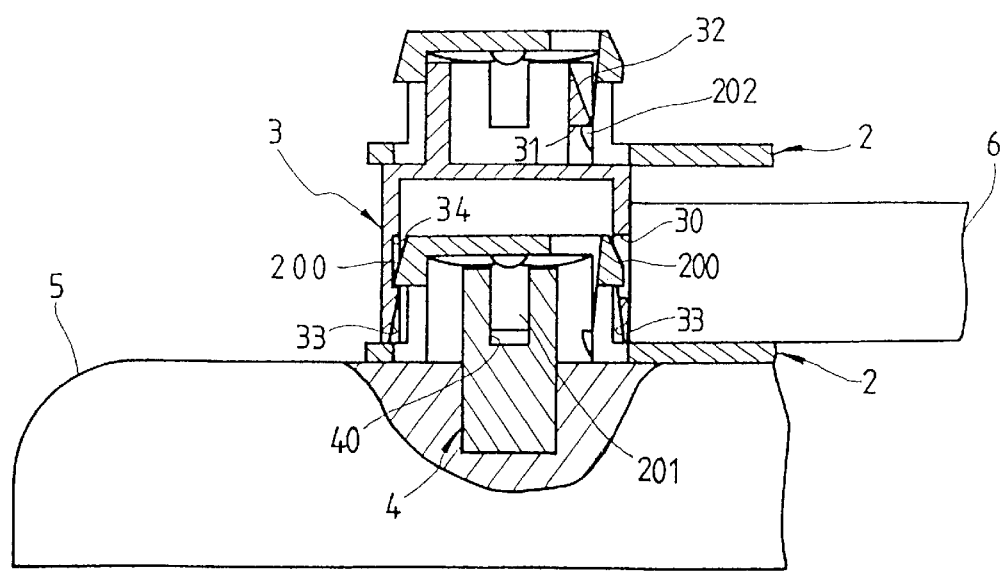
FIG. 4 is a sectional view showing the structure of the present invention.

Referring to FIGS. 2 and 4, the present invention is assembled by means of a plurality of plungers 4 provided on the base 5. Each plunger 4 is provided with a central blind hole 40. The central top core 201 of a separation plate 2 can be inserted into the central blind hole 40 of the plunger 4. So that the separation plate 2 can be laid on the top surface of the base 5, in this way, the separation plate 2 and the base 5 are combined with each other. Then the hollow locking caps 3 are directly fitted over the hollow puncheons 20 of the separation plate 2, and the first hooks 200 of the hollow puncheons 20 are engaged in the first engaging through slots 30 and the third engaging slots 34 of the hollow locking caps. And the protruding ends of the locking caps 3 are inserted into the hollow puncheons 20 of another separation plate 2. So that the second hooks 202 on the hollow puncheons 20 are inserted into the second engaging slots 31 of the hollow locking caps 3. Therefore, each hollow locking cap 3 can be used to space two separation plates 2 parallel to each other and forms an interspace for receiving a CD 6. By fitting of the hollow locking caps 3 over the hollow puncheons 20 of a separation plate 2, and by insertion of the hollow locking caps 3 in the interior of another separation plate 2, the separation plates 2 can be assembled layer by layer parallelly. While during assembling, the slopes 32, 33 on the hollow locking caps 3 can effect entering the engaging slots by the first hooks 200 and the second hooks 202 on the hollow puncheons 20 of the separation plates 2 easily and smoothly. This can help increasing easiness of assembling. Further, the mode of the present invention in mounting the separation plates 2 for forming a CD rack by engagement of the hollow puncheons 20 and the hollow locking caps 3 can result a firm structure. Thereby, the CD rack is not to wave when in taking off some CDs. And most importantly, the separation plates 2 of the present invention can be assembled or dismantled at any time depending upon the amount of CDs required, so that the separation plates 2 of the CD rack will not be redundant which may destroy an indoor scenery.

Having thus described my invention, what I claim as new and desire to be secured by Letters Patent of the United States are:

1. A CD rack comprised of a base, a plurality of separation plates and a plurality of locking caps, wherein, a plurality of hollow puncheons are provided on corners on the top of said separation plates, said hollow puncheons are provided each on both sides thereof opposite mutually and facing outwardly and inwardly respectively with a first hook at the middle of said each side; one of said sides facing inwardly is provided with two second hooks;

said locking caps are each a hollow body and are provided each with an engaging through slot exteriorly and with a depressed engaging slot interiorly;

one of said separation plates is laid on the top surface of said base, then said hollow locking caps are fitted over said hollow puncheons of said separation plate to make engagement of said first hooks provided on said hollow puncheons with said engaging through slots; and said hollow locking caps are inserted in the interior of another of said separation plates to make engagement of said second hooks on said hollow puncheons with a plurality of second hooks engaging through slots on said hollow locking caps; whereby, fitting of said hollow locking caps over said hollow puncheons of said one of said separation plates, and by insertion of said hollow locking caps in the interior of said another separation plate, said separation plates can be assembled layer by layer in parallel, and the interspaces between every two of said separation plates are used to receive CDs; and a plurality of plungers are provided on said base, said plungers are provided each with a central blind hole. a central top core is provided on each of said puncheons on one of said separation plates and is inserted into said central blind hole of one of said plungers, so that said separation plate can be laid on the top of and engaged with said base.

* * * * *